(12) United States Patent
Koshy et al.

(10) Patent No.: US 11,510,047 B2
(45) Date of Patent: Nov. 22, 2022

(54) LEARNING BASED WIRELESS PERFORMANCE ADJUSTMENT FOR MOBILE INFORMATION HANDLING SYSTEM

(71) Applicant: Dell Products, LP, Round Rock, TX (US)

(72) Inventors: Kamal J. Koshy, Austin, TX (US); Karun P. Reddy, Austin, TX (US)

(73) Assignee: Dell Products, LP, Round Rock, TX (US)

( * ) Notice: Subject to any disclaimer, the term of this patent is extended or adjusted under 35 U.S.C. 154(b) by 0 days.

(21) Appl. No.: 16/538,721

(22) Filed: Aug. 12, 2019

(65) Prior Publication Data
US 2021/0051465 A1 Feb. 18, 2021

(51) Int. Cl.
| | |
|---|---|
| H04W 8/12 | (2009.01) |
| H04W 4/029 | (2018.01) |
| G06N 20/00 | (2019.01) |
| H04W 24/10 | (2009.01) |
| H04W 64/00 | (2009.01) |

(52) U.S. Cl.
CPC ............. *H04W 8/12* (2013.01); *G06N 20/00* (2019.01); *H04W 4/029* (2018.02); *H04W 24/10* (2013.01); *H04W 64/006* (2013.01)

(58) Field of Classification Search
CPC ....... H04W 8/12; H04W 4/029; H04W 24/10; H04W 64/006; H04W 36/08; H04W 52/146; H04W 76/16; H04W 28/22; G06N 20/10; G06N 20/20; H04Q 9/00; G01S 5/0252; H04B 1/3838; G06K 9/6202; H04L 67/18; H04L 43/08; H01Q 3/38; G05D 1/0022
See application file for complete search history.

(56) References Cited

U.S. PATENT DOCUMENTS

| | | |
|---|---|---|
| 8,838,376 B2 | 9/2014 | Garin |
| 8,847,754 B2 | 9/2014 | Buchheim |
| 8,874,129 B2 | 10/2014 | Foruntanpour |

(Continued)

OTHER PUBLICATIONS

LoWMob: Intra-PAN Mobility Support Schemes for 6LoWPAN Gargi Bag 1, Muhammad Taqi Raza 2 , Ki-Hyung Kim 1 and Seung-Wha Yoo , ISSN 1424-8220, 2009 (Year: 2009).*

*Primary Examiner* — Ayaz R Sheikh
*Assistant Examiner* — Louis Samara
(74) *Attorney, Agent, or Firm* — Prol Intellectual Property Law, PLLC; H. Kenneth Prol

(57) ABSTRACT

A mobile information handling system may include, in an embodiment, a wireless network interface; a wireless performance modulator to adjust the performance of the wireless network interface; and a sensor to receive input descriptive of the environment of the mobile information handling system and provide the input to the wireless performance modulator to adjust the performance of the wireless network interface based on information associated with the sensed environment received by the sensor wherein the sensor is a movement sensor to detect the movement of the mobile information handling system so as to determine, with the wireless performance modulator, whether to initiate a roaming process to search for a wireless network to communicatively couple the mobile handling system upon detection of movement above a threshold level.

20 Claims, 7 Drawing Sheets

(56) References Cited

U.S. PATENT DOCUMENTS

| | | |
|---|---|---|
| 9,168,656 B1 | 10/2015 | Wang |
| 9,204,257 B1 | 12/2015 | Mendelson |
| 9,674,658 B2 | 6/2017 | Partheesh |
| 9,677,890 B2* | 6/2017 | Yang .................... G01C 21/005 |
| 9,802,322 B2 | 10/2017 | Angle |
| 10,140,769 B2 | 11/2018 | Kim |
| 10,218,403 B2 | 2/2019 | Koshy |
| 10,278,154 B2* | 4/2019 | Ronen ................... H04W 64/00 |
| 10,318,890 B1* | 6/2019 | Kravets ................. H04W 4/029 |
| 10,321,463 B1 | 6/2019 | Ramasamy |
| 2013/0217450 A1* | 8/2013 | Kanj .................... H01Q 21/293 |
| | | 455/575.7 |
| 2014/0273819 A1* | 9/2014 | Nadakuduti ......... H04B 5/0025 |
| | | 455/41.1 |
| 2015/0019163 A1* | 1/2015 | Needham ............... G01B 11/26 |
| | | 702/151 |
| 2015/0031390 A1 | 1/2015 | Robertson |
| 2015/0289094 A1 | 10/2015 | Jang |
| 2016/0282862 A1 | 9/2016 | Duffley |
| 2017/0077977 A1* | 3/2017 | Prendergast ......... H04B 1/3838 |
| 2018/0091935 A1* | 3/2018 | Renaldi ................... H04L 67/52 |
| 2018/0132116 A1* | 5/2018 | Shekhar ................... H01Q 3/38 |
| 2018/0295663 A1* | 10/2018 | Lee ....................... H04W 24/10 |
| 2019/0036563 A1* | 1/2019 | Koshy ................. H04W 52/18 |
| 2019/0052312 A1* | 2/2019 | Fuchs ..................... H01Q 1/46 |
| 2019/0163848 A1* | 5/2019 | McGranahan ..... G05B 23/0254 |
| 2019/0304408 A1* | 10/2019 | Seethaler ............... G06V 10/24 |
| 2020/0033849 A1* | 1/2020 | Yiu ....................... G05D 1/0022 |
| 2020/0305049 A1* | 9/2020 | Vasseur ................. H04W 36/32 |
| 2022/0038359 A1* | 2/2022 | Svennebring ........... H04L 43/08 |
| 2022/0046478 A1* | 2/2022 | Oyman ................. H04W 28/22 |

* cited by examiner

| Mode | Looks | SAR Backoff Used When User Using Device (Ex. Antenna In Base, Hinge) | SAR Backoff Used In Certain Modes When User is using Device (Antenna On Top) |
|---|---|---|---|
| Laptop Orientation 505 | | Reduced Performance If Motion Detected; Full Performance Otherwise | Full Performance |
| Stand Orientation 510 | | Reduced Performance If Motion Detected; Full Performance Otherwise | Full Performance |
| Tent Orientation 515 | | Reduced Performance If Motion Detected; Full Performance Otherwise | Full Performance |
| Modified Stand Orientation 520 | | Reduced Performance If Motion Detected; Full Performance Otherwise | Full Performance |
| Tablet Orientation 525 | | Reduced Performance If Motion Detected; Full Performance Otherwise | Full Performance |

FIG. 5

LEARNING BASED WIRELESS PERFORMANCE ADJUSTMENT FOR MOBILE INFORMATION HANDLING SYSTEM

FIELD OF THE DISCLOSURE

The present disclosure generally relates to antennas within a mobile information handling system. The present disclosure more specifically relates to wireless performance of an antenna based on device usage, sensor data received by a plurality of sensors of the mobile information handling system, and states of the mobile information handling system determined through machine learning techniques.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling may vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include telecommunication, network communication, and video communication capabilities. Further, the information handling system may include wireless communication such as via various types of protocols as described.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which:

FIG. 5 is a graphical table describing a plurality of orientation modes of a mobile information handling system according to an embodiment of the present disclosure;

The use of the same reference symbols in different drawings may indicate similar or identical items.

DETAILED DESCRIPTION OF THE DRAWINGS

Figure 1:
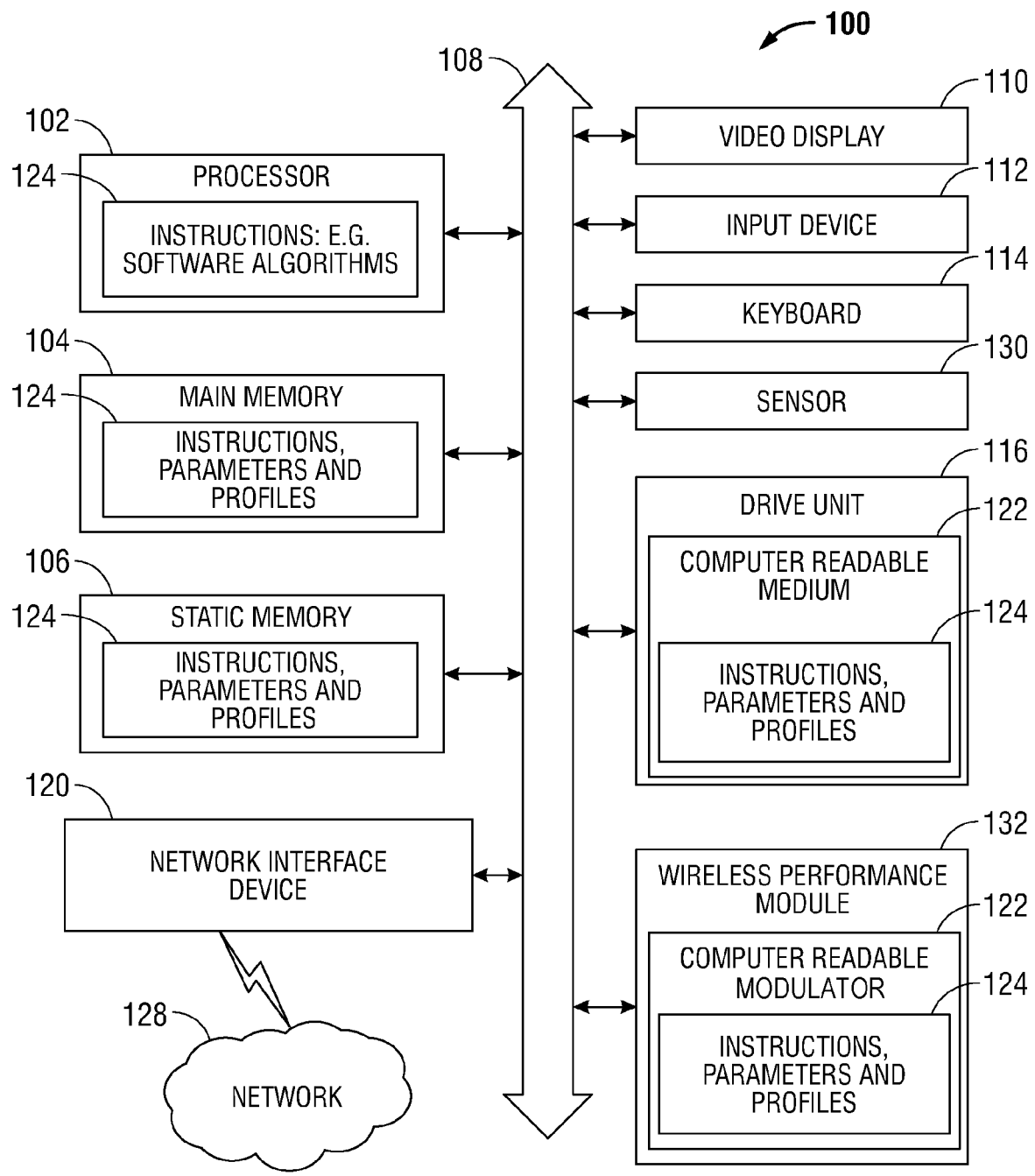
FIG. 1 is a block diagram illustrating an information handling system according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Embodiments of the present disclosure provide for a mobile information handling system that accounts for an orientation mode of the mobile information handling system as well as sensor data in order to adjust a transmission power of an antenna, initiate a roaming process upon detection of movement of the mobile information handling system, and/or engaging in a beam steering process. These changes to the functionality of the mobile information handling system may be initiated based on specific types of sensor data such that changes in location or movement of the mobile information handling system initiates, relatively quicker, a roaming process so that a new access point may be identified and/or an access point having a relatively stronger signal may be identified more quickly and efficiently.

In addition to providing better roaming functionality, the mobile information handling system and method described herein may allow for a dynamic adjustment of the transmission power of an antenna of a wireless network interface used to communicatively couple the mobile information handling system to a network. Adjustments in the transmission power may dynamically conserve energy and increase communicative abilities between the mobile information handling system in the network so that the user may initiate communication with a networked device while decreasing the power consumption of the mobile information handling system during downtime.

In addition to providing these features, the mobile information handling system may be able to steer emitted electromagnetic radiation based upon detected characteristics of the mobile information handling system by the sensors relation to orientation of the mobile information handling system.

As mobile computing infrastructure evolves worldwide to enable mobile information handling systems to transmit and receive larger amounts of data more quickly and easily while on the move, the abilities of these mobile information handling systems to receive and transmit various signals increase in demand. Wireless performance of any given mobile information handling system remains generally static such that information at a system level within the mobile information handling system is not used to dynamically adjust wireless performances.

In some examples, mobile information handling systems at present may statically select access points, roam only when the mobile information handling system detects poor wireless performance, and select certain channels that have relatively higher signal strength. This results in less than optimal wireless performance by these mobile information handling systems. While the simplest solution to this need may involve the addition of multiple transceiving (i.e., transmitting and receiving) antennas within the mobile information handling system, with each antenna dedicated to a single type of signal, this solution conflicts with a competing goal of rendering the mobile information handling system slim, lightweight, and efficient. The inclusion of additional antennas also presents a host of potential problems associated with interference between each of the antennas as well as an increased exposure of a user to potentially harmful electrical signals.

Still further, due to regulatory requirements in operation of a mobile information handling system, a fixed transmission power levels produced by any wireless network interface or antenna of a mobile information handling system is sometimes set at time of manufacture and is unchanged throughout the use of the mobile information handling system except for limited specific absorption rate (SAR) triggers. In no circumstance is the use of the mobile information handling system taken into consideration if, when, and how a transmission power is adjusted. Indeed, some mobile information handling systems may be used via a number of different configurations such as a laptop configuration, a stand configuration, a tent configuration, and a tablet configuration based on where a keyboard portion of the mobile information handling system is placed relative to a screen portion of the mobile information handling system. Still further, these mobile information handling systems fail to consider, during a decision as to the transmission power used, a location of the mobile information handling system, a state of transmission or receipt of a wireless signal at the mobile information handling system, among other considerations.

The present description describes a mobile information handling system that may alter the transmission power level based on the orientation mode of the mobile information handling system, the current movement of the mobile information handling system, the location of a user proximate to the mobile information handling system, or a combination thereof. Further the mobile information handling system may adaptively trigger roaming processes that are initiated when movement of the mobile information handling system is detected. Even further, the presently described mobile information handling system may enable an access point searching process based on data received from a number of sensors within or associated with the mobile information handling system.

FIG. 1 illustrates a mobile information handling system 100 similar to information handling systems according to several aspects of the present disclosure. In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, a mobile information handling system 100 can be a personal computer, mobile device (e.g., personal digital assistant (PDA) or smart phone), server (e.g., blade server or rack server), a consumer electronic device, a network server or storage device, a network router, switch, or bridge, wireless router, or other network communication device, a network connected device (cellular telephone, tablet device, etc.), IoT computing device, wearable computing device, a set-top box (STB), a mobile information handling system, a palmtop computer, a laptop computer, a desktop computer, a communications device, an access point (AP), a base station transceiver, a wireless telephone, a control system, a camera, a scanner, a facsimile machine, a printer, a pager, a personal trusted device, a web appliance, or any other suitable machine capable of executing a set of instructions (sequential or otherwise) that specify actions to be taken by that machine, and can vary in size, shape, performance, price, and functionality.

In a networked deployment, the information handling system 100 may operate in the capacity of a server or as a client computer in a server-client network environment, or as a peer computer system in a peer-to-peer (or distributed) network environment. In a particular embodiment, the information handling system 100 can be implemented using electronic devices that provide voice, video or data communication. For example, an information handling system 100 may be any mobile or other computing device capable of executing a set of instructions (sequential or otherwise) that specify actions to be taken by that machine. Further, while a single information handling system 100 is illustrated, the term "system" shall also be taken to include any collection of systems or sub-systems that individually or jointly execute a set, or multiple sets, of instructions to perform one or more computer functions.

The information handling system can include memory (volatile (e.g. random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system 100 can include one or more storage devices, one or more communications ports for communicating with external devices, as well as, various input and output (I/O) devices, such as a keyboard, a mouse, a video/graphic display, or any combination thereof. The information handling system 100 can also include one or more buses operable to transmit communications between the various hardware components. Portions of an information handling system 100 may themselves be considered information handling systems 100.

Information handling system 100 can include devices or modules that embody one or more of the devices or execute instructions for the one or more systems and modules described herein, and operates to perform one or more of the methods described herein. The information handling system 100 may execute code instructions 124 that may operate on servers or systems, remote data centers, or on-box in individual client information handling systems according to various embodiments herein. In some embodiments, it is understood any or all portions of code instructions 124 may operate on a plurality of information handling systems 100.

The information handling system 100 may include a processor 102 such as a central processing unit (CPU), control logic or some combination of the same. Any of the processing resources may operate to execute code that is either firmware or software code. Moreover, the information handling system 100 may include memory such as main memory 104, static memory 106, computer readable medium 122 storing instructions 124 of a wireless performance modulator 132, and drive unit 116 (volatile (e.g. random-access memory, etc.), nonvolatile (read-only memory, flash memory etc.) or any combination thereof).

The information handling system 100 can also include one or more buses 108 operable to transmit communications between the various hardware components such as any combination of various input and output (I/O) devices.

The information handling system 100 may further include a video display 110. The video display 110 in an embodiment may function as a liquid crystal display (LCD), an organic light emitting diode (OLED), a flat panel display, a solid-state display, or a cathode ray tube (CRT). Additionally, the information handling system 100 may include an input device 112, such as a cursor control device (e.g., mouse, touchpad, or gesture or touch screen input, and a keyboard 114. The information handling system 100 can also include a disk drive unit 116.

The network interface device shown as wireless interface device 120 can provide connectivity to a network 128, e.g., a wide area network (WAN), a local area network (LAN), wireless local area network (WLAN), a wireless personal area network (WPAN), a wireless wide area network (WWAN), or other networks. Connectivity may be via wired or wireless connection. The network interface device 120 may operate in accordance with any wireless data communication standards. To communicate with a wireless local area network, standards including IEEE 802.11 WLAN standards, IEEE 802.15 WPAN standards, WWAN such as 3GPP or 3GPP2, or similar wireless standards may be used. In some aspects of the present disclosure, one network interface device 120 may operate two or more wireless links.

The network interface device 120 may connect to any combination of macro-cellular wireless connections including 2G, 2.5G, 3G, 4G, 5G or the like from one or more service providers. Utilization of radiofrequency communication bands according to several example embodiments of the present disclosure may include bands used with the WLAN standards and WWAN carriers, which may operate in both license and unlicensed spectrums. For example, both WLAN and WWAN may use the Unlicensed National Information Infrastructure (U-NII) band which typically operates in the ~5 MHz frequency band such as 802.11 a/h/j/n/ac (e.g., center frequencies between 5.170-5.785 GHz). It is understood that any number of available channels may be available under the 5 GHz shared communication frequency band. WLAN, for example, may also operate at a 2.4 GHz band. WWAN may operate in a number of bands, some of which are proprietary but may include a wireless communication frequency band at approximately 2.5 GHz band for example. In additional examples, WWAN carrier licensed bands may operate at frequency bands of approximately 700 MHz, 800 MHz, 1900 MHz, or 1700/2100 MHz for example as well.

In some embodiments, software, firmware, dedicated hardware implementations such as application specific integrated circuits (ASICs), programmable logic arrays and other hardware devices can be constructed to implement one or more of some systems and methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by firmware or software programs executable by a controller or a processor system such as processor 102 described herein. Further, in an exemplary, non-limited embodiment, implementations can include distributed processing, component/object distributed processing, and parallel processing. Alternatively, virtual computer system processing can be constructed to implement one or more of the methods or functionalities as described herein.

The present disclosure contemplates a computer-readable medium that includes instructions, parameters, and profiles 124 or receives and executes instructions, parameters, and profiles 124 responsive to a propagated signal, so that a device connected to a network 128 can communicate voice, video or data over the network 128. Further, the instructions 124 may be transmitted or received over the network 128 via the network interface device 120 or other types of wireless adapters.

The information handling system 100 can include a set of instructions 124 that can be executed to cause the computer system to perform any one or more of the methods or computer-based functions disclosed herein. For example, instructions 124 may execute a wireless performance modulator 132, software agents, or other aspects or components. Various software modules comprising application instructions 124 may be coordinated by an operating system (OS), and/or via an application programming interface (API). An example operating system may include Windows®, Android®, and other OS types. Example APIs may include Win 32, Core Java API, or Android APIs.

The disk drive unit 116 and the wireless performance modulator 132 may include a computer-readable medium 122 in which one or more sets of instructions 124 such as software can be embedded. Similarly, main memory 104 and static memory 106 may also contain a computer-readable medium for storage of one or more sets of instructions, parameters, or profiles 124. The disk drive unit 116 and static memory 106 may also contain space for data storage. Further, the instructions 124 may embody one or more of the methods or logic as described herein. For example, instructions relating to the wireless performance modulator 132 software algorithms, processes, and/or methods may be stored here. In a particular embodiment, the instructions, parameters, and profiles 124 may reside completely, or at least partially, within the main memory 104, the static memory 106, and/or within the disk drive 116 during execution by the processor 102 of information handling system 100. As explained, some or all of wireless performance modulator 132 may be executed locally or remotely. The main memory 104 and the processor 102 also may include computer-readable media.

Main memory 104 may contain computer-readable medium (not shown), such as RAM in an example embodiment. An example of main memory 104 includes random access memory (RAM) such as static RAM (SRAM), dynamic RAM (DRAM), non-volatile RAM (NV-RAM), or the like, read only memory (ROM), another type of memory, or a combination thereof. Static memory 106 may contain computer-readable medium (not shown), such as NOR or NAND flash memory in some example embodiments. The wireless performance modulator 132 may be stored in static memory 106, or the drive unit 116 on a computer-readable medium 122 such as a flash memory or magnetic disk in an example embodiment. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

The information handling system 100 may also include the wireless performance modulator 132 that may be operably connected to the bus 108. The wireless performance modulator 132 computer readable medium 122 may also contain space for data storage. The wireless performance modulator 132 may, according to the present description, perform tasks related to receiving at the wireless performance modulator 132, from one or more sensors 130, data descriptive of an orientation of the mobile information handling system 100, movement of the mobile information handling system 100, and/or human presence near an antenna of the mobile information handling system 100, determining, based on the data, the orientation of, movement of, and human presence near the mobile information handling system 100; and, based on the state of the orientation of, movement of, and human presence near the mobile information handling system adjusting the transmission power of an antenna associated with a wireless network interface.

In an embodiment, the wireless performance modulator 132 may communicate with the main memory 104, the processor 102, the video display 110, the alpha-numeric input device 112, and the network interface device 120 via bus 108, and several forms of communication may be used, including ACPI, SMBus, a 24 MHZ BFSK-coded transmission channel, or shared memory. Keyboard driver software, firmware, controllers and the like may communicate with applications on the information handling system 100.

In other embodiments, dedicated hardware implementations such as ASICs, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

When referred to as a "system", a "device," a "module," a "controller," or the like, the embodiments described herein can be configured as hardware. For example, a portion of an information handling system device may be hardware such as, for example, an integrated circuit (such as an ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). The system, device, controller, or module can include software, including firmware embedded at a device, such as an Intel® Core class processor, ARM® brand processors, Qualcomm® Snapdragon processors, or other processors and chipsets, or other such device, or software capable of operating a relevant environment of the information handling system. The system, device, controller, or module can also include a combination of the foregoing examples of hardware or software. In an embodiment an information handling system 100 may include an integrated circuit or a board-level product having portions thereof that can also be any combination of hardware and software. Devices, modules, resources, controllers, or programs that are in communication with one another need not be in continuous communication with each other, unless expressly specified otherwise. In addition, devices, modules, resources, controllers, or programs that are in communication with one another can communicate directly or indirectly through one or more intermediaries.

Figure 2:
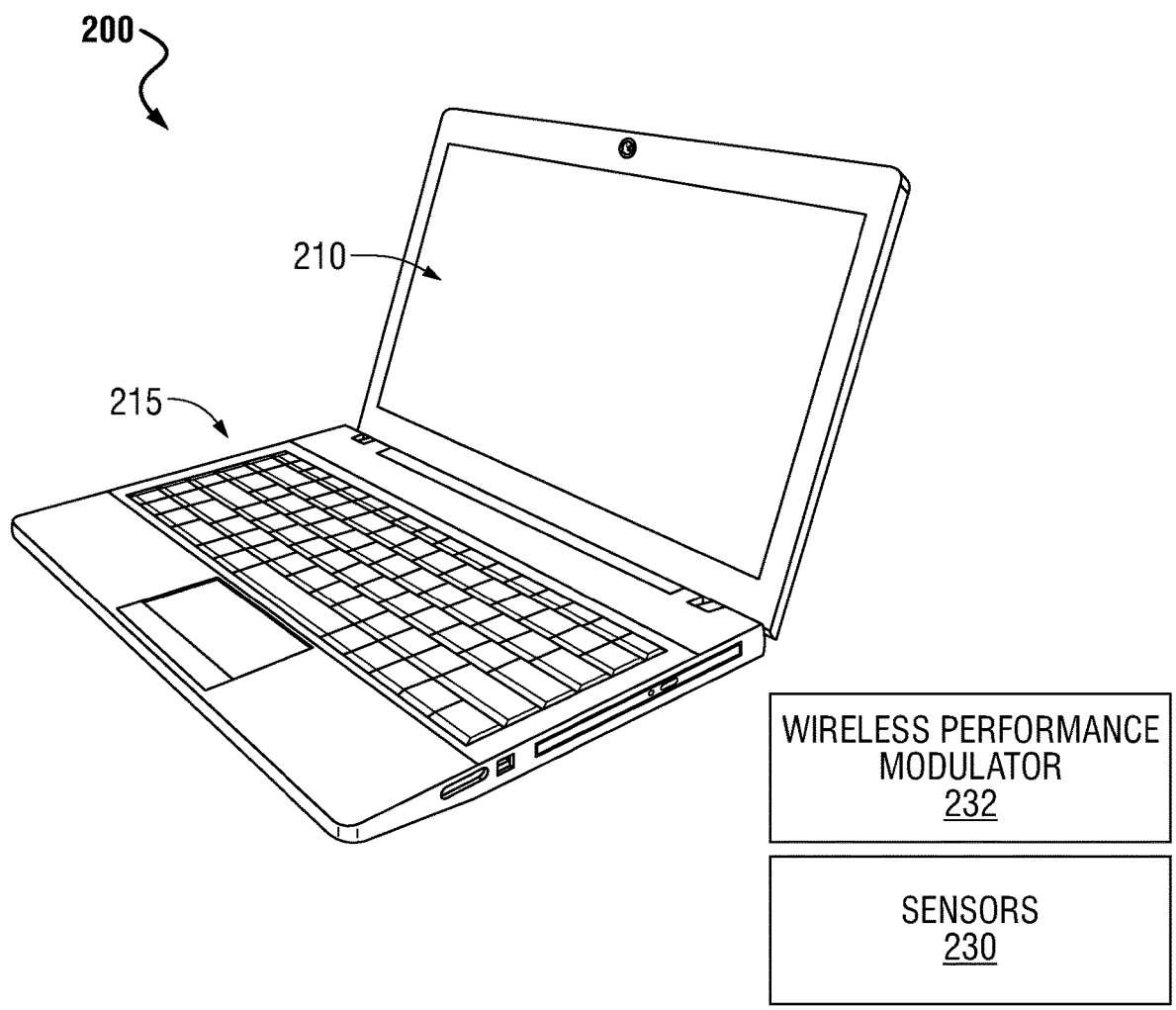
FIG. 2 is a perspective graphical diagram of a mobile information handling system according to an embodiment of the present disclosure.

FIG. 2 is a perspective graphical diagram of a mobile information handling system 200 according to an embodiment of the present disclosure. FIG. 2 shows the mobile information handling system 200 as a laptop computing device. In this example, the mobile information handling system 200 includes a screen portion 210 mechanically and electronically coupled to a keyboard portion 215 that forms the shape and functionality of the laptop computing device. In some embodiments, the information handling system 200 may be a 360° convertible laptop computing device or a dual screen tablet information handling system.

The screen portion 210 may be mechanically coupled to the keyboard portion 215 via a hinge or other device that allows for different orientations of the mobile information handling system 200 where the relative position of the screen portion 210 to the keyboard portion 215 may be changed during use. Specific examples of these orientations may include a laptop orientation shown in FIG. 2. This laptop orientation allows for the user to access the keyboard portion 215 so as to provide input to the mobile information handling system 200 while viewing the screen portion 210.

In an embodiment, the mobile information handling system 200 may be placed in a stand orientation. In this stand orientation, the keyboard portion 215 may be flipped and rest behind the screen portion 210 so that any input devices such as the keys formed within the keyboard portion 215 face downward on a surface and the back portion of the keyboard portion 215 is facing up from the surface. This stand orientation places the screen portion 210 forward allowing the user to interact with the screen alone and may, in some embodiments, provide input via the touch-sensitive screen of the screen portion 210.

In an embodiment, the mobile information handling system 200 may be placed in a tent orientation. This tent orientation may be accomplished by orienting the screen portion 210 forward with the keyboard portion 215 placed behind the screen portion 210 acting as a support to allow a user to see the screen without holding the screen portion 210. This tent orientation allows, again, for the user to view a screen on the screen portion 210 while, in some embodiments, providing input to the mobile information handling system 200 by a touch-sensitive screen. As such, this orientation of the keyboard portion 215 relative to the screen portion 210 creates a tent shape when the mobile information handling system 200 is viewed from the side.

In an embodiment, the mobile information handling system 200 may be placed in a modified stand orientation. In this modified stand orientation may be accomplished by placing the mobile information handling system 200, the laptop orientation, on its side with the screen portion 210 and keyboard portion 215 no oriented on either a left or right side. This may place both the screen portion 210 and keyboard portion 215 at a 90-degree angle (counter-clockwise or clockwise) to the position it had in the laptop orientation.

In an embodiment, the mobile information handling system 200 may be placed in a tablet orientation. In this table orientation, the keyboard portion 215 may be folded against the screen portion 210 such that the screen of the screen portion 210 is facing the user and a bottom surface of the keyboard portion 215 placed against the back of the screen portion 210. In an alternative embodiment, the screen portion 210 may be temporarily removed from the keyboard portion 215 and reassembled with the top side of the keyboard portion 215 facing the bottom portion of the screen portion 210. In either embodiment, however, the screen of the screen portion 210 is made viewable and may include a touch-sensitive surface to receive input form a user thereon.

In an embodiment, the orientation of the mobile information handling system 200 may be detected by a sensor 230 or a plurality of sensors 230 communicatively coupled to the mobile information handling system 200 via a bus such as an i2C bus. In a specific embodiment, the sensors 230 may include one of more of a gyroscope, an accelerometer, or hall effect sensors. These sensors 230 may be used with a wireless performance modulator to determine if the mobile information handling system 200 is stationary or not or whether the mobile information handling system 200 is being moved. Additionally, the data received by the sensors 230 may be used by the wireless performance modulator to determine if and to what extent a transmission power of an antenna of a wireless network interface is to be adjusted.

The sensors 230 may further include a specific absorption rate (SAR) sensor. A SAR sensor 230 may be any sensor that is capable of discriminating between an inanimate object and a human body within a certain proximity of the SAR sensor and, accordingly, the mobile information handling system 200. During use of a wireless devices such as the mobile information handling system 200 described herein, a user's body is subjected to or exposed to a radio frequency (RF) electromagnetic field. Due to regulations in certain countries such as the United States, this RF electromagnetic field must be limited to avoid alleged adverse health effects on the user. As an example, a whole-body average of 0.4 W/kg may be chosen as the restriction that provides adequate protection for occupational exposure. During operation of the mobile information handling system 200, the SAR sensor 230 may detect whether a human body is within a proximity of the mobile information handling system 200 and adjust the transmission power of the antenna and/or adjust the radiation pattern of the antenna in a beam steering process.

In an embodiment, the mobile information handling system 200 may operate by receiving, at the wireless performance module, data descriptive of a state of the mobile information handling system 200. This data may be received from the sensors described herein. Thus, a "state" of the mobile information handling system 200 is meant to be understood herein as an orientation of the mobile information handling system 200, environmental characteristics present in and around the mobile information handling system 200 such as the presence of a human body, and/or movement of the information handling system 200, among other characteristics of operation and/or physical characteristics of the information handling system 200. During operation of the mobile information handling system 200, the wireless performance modulator may modulate or adjust the performance of the wireless network interface and, in particular, the antenna of the wireless network interface. In an embodiment, when the mobile information handling system 200 is stationary and a human is detected to be within a proximity of the mobile information handling system, the wireless performance modulator may adjust a transmission power of the antenna of the wireless network interface.

In an embodiment, the data received from the sensors 230 described herein may also be used to determine whether a roaming process is to be initiated. This roaming process may include any method or execution of computer-readable program code that, based on the data received from the sensors 230, determines whether the mobile information handling system 200 should or should review accessible wireless networks and change the network to which the mobile information handling system 200 is communicatively coupled to. By way of example, once the sensors 230 (i.e., accelerometer, gyroscope, or hall effect sensor) may detect movement of the mobile information handling system 200 and the wireless performance modulator may, after detection of movement, may initiate the roaming process to immediately detect whether new or additional access points are available to the mobile information handling system 200. In an embodiment, a threshold level of movement may be determined prior to the initiation of the roaming process so as to reduce the number of instances the roaming process is conducted. In this embodiment, the threshold distance of movement may be 10 or more feet or may be based on the specific ability of the antenna to emit or receive signals. During this process, the wireless performance modulator may also determine the signal strength of all discovered access points so as to provide to the mobile information handling system 200 the most reliable wireless connectivity. In this example, the RSSI value or a reduction of the RSSI value between the information handling system 100 and an access point may be used to determine when to initiate the roaming process described herein.

The use of the sensors in combination with the wireless performance modulator allows for the wireless performance of the mobile information handling system 200 to be adjusted so as to increase the variability of the wireless performance of, for example, a wireless network interface so as to increase versatility of the mobile information handling system 200. Specifically, the transmission power of an antenna of the wireless network interface may be altered in order to increase wireless connectivity between the mobile information handling system 200 and a wireless network.

In an embodiment, the mobile information handling system 200 and methods described herein may utilize a machine learning process to determine 1) how a user is operating the mobile information handling system 200 (i.e., what orientation mode the mobile information handling system 200 is in); 2) where the user is using the mobile information handling system 200 (i.e., location based on wireless location-identification techniques and sensors in the mobile information handling system 200); and/or 3) whether the mobile information handling system 200 is transmitting or receiving data wirelessly. The machine learning process may, therefore, create policies that, based on input from the sensors, reduces the uncertainty of how the mobile information handling system 200 is being used and, consequently, may learn how to increase the reliability, functionality, and/or usability of the mobile information handling system 200. In a specific embodiment, the machine learning process may use as input a plurality of data points that includes the orientation of the information handling system, the location of the information handling system, the presence (or not) of a human by the information handling system, the state of the information handling system (i.e., on, off, or sleep modes), among other data points. These data points may result in an output the dictates how the power transmission of the antenna is to be altered, if at all. As a result, the accuracy, completeness, dependability of the mobile information handling system 200 and access to network resources may be increased resulting in higher user satisfaction and production. During execution of the machine learning process, the herein-described data points may be used as input using any supervised or unsupervised machine learning technique. With these machine learning techniques, the roaming process may or may not be triggered, the power level associated with a transmission from an antenna may be lowered or raised, and/or the directionality of the antenna may be adjusted based on the input and the machine learning processes employed.

In an embodiment, a sensor fusion machine learning process may include receiving any number of data points and/or information from the sensors 230 and utilize that data and/or information in connection with a detected orientation mode the user is using the mobile information handling system 200. In connection with this process, the detected orientation mode and data and/or information from the sensors 230 may be used to determine how and/or to what extent a radiation transmission power of a wireless network interface is adjusted. In the embodiments presented herein, the fusion machine learning process is executed using the wireless performance modulator 232. In an embodiment, the wireless performance modulator 232 may be in the form of computer-readable program code defined by instructions, parameters, and profiles that is maintained on a computer readable medium described herein. In an embodiment, the wireless performance modulator 232 may be in the form of an application-specific integrated circuit that includes circuitry that performs the processes and methods described herein.

In some embodiments, the wireless performance modulator 232, via execution of the sensor fusion machine learning process, may also adjust the transmission power of a wireless adapter or wireless network interface based on the presence of a human by the mobile information handling system 200, whether the user is logged out of a desktop environment, whether the operating system of the mobile information handling system 200 is in a standby mode, or a combination thereof. In a specific embodiment, the sensor fusion machine learning process may determine if a user is not present in front of the mobile information handling system 200 so as to reduce power consumption of the wireless network interface by reducing the transmission power of an electromagnetic signal from the wireless network interface. In this embodiment, additional criteria such as a determination that the user is logged out of a desktop environment and/or whether the operating system of the mobile information handling system 200 is in a standby mode may be detected as well to determine if and to what extent to transmit power of an electromagnetic signal from the wireless network interface.

In an embodiment, the mobile information handling system 200 may adapt its performance associated with a network based on the usage of the mobile information handling system 200 by the user. In this embodiment, the sensors 230 of the mobile information handling system 200 may detect when a physical location of the mobile information handling system 200 has changed. The type of sensors 230 used to determine this change in location may include an accelerometer, a gyroscope, a hall effect sensor or other type of motion detection sensor. In an embodiment presented herein, the change in location may be determined using a GPS system of the information handling system. In another embodiment, the change in location may be detected using a triangulation process that detects the RSSI value between the information handling system and a plurality of access points by, in real-time, measuring the RSSI values relative to time of flight (TOF) values. Whichever process is used to detect a change in location, upon detection that the location of the mobile information handling system 200 has changed, a roaming process may be initiated so as to secure, for the mobile information handling system 200, any relatively more reliable connections to the wireless network. The roaming process may specifically include the wireless network interface conducting a search of all wireless signals presented from any and all access points within a range of the wireless network interface of the mobile information handling system 200. The signal strength of each of these access points may be evaluated and, based on the location data received by the mobile information handling system 200 by the sensors 230, initiate a connection with any access point that may benefit the functionality of the mobile information handling system 200. The benefit in functionality may include considerations such as the strength of the signals associated with each access point, the orientation mode of the mobile information handling system 200 the user is operating the mobile information handling system 200 in, the reliability of the networks available to the wireless network interface, among other considerations.

In an embodiment, the sensor fusion machine learning process may take the multiple inputs as described herein in order to adjust the transmission characteristics of the antenna without explicit instructions provided. The sensor fusion machine learning process may, therefor build a mathematical model based on sampled data from the movement sensor, the SAR sensor, and the orientation mode of the information handling system in order to make predictions or decisions as to how to adjust the transmission characteristics of the antenna. By way of example, the sensor fusion machine learning process may direct the receipt of training input descriptive of the number of access points wirelessly available at any given location of the information handling system. Additionally, the sensor fusion machine learning process may direct the receipt of training input as to a location of an antenna within the information handling system based on an orientation of the information handling system at any given time. Still further, the sensor fusion machine learning process may direct the receipt of training data descriptive of a location of a user's body (i.e., hand, lap, head, etc.) relative to the antenna of the information handling system as well as how the location of the user's body relative to the antenna increases or decreases the SAR value at any given transmission power at the antenna. With this training data, the sensor fusion machine learning process may execute any type of machine learning process such as any type of supervised learning process (i.e., support vector machines, linear regression, logistic regression, naïve Bayes, linear discrimination analysis, decision trees, k-nearest neighbor algorithm, neural networks, and similarity learning, among others) or unsupervised learning process (i.e., clustering, anomaly detection, neural networks, and any latent carriable models, among others) to conclude whether and to what extent to 1) initiate a roaming process; 2) adjust the transmission power of the antenna, and 3) steer the electromagnetic radiation emitted by the antenna in a specific direction.

By way of example, a user may, during use of the information handling system, close a laptop, grab the laptop directly at a location where the antenna of the information handling system is present, and walk away from an original location beyond a threshold distance. In this example, the sensor fusion machine learning process may consider that a roaming process may be initiated based on the movement of the information handling system but may take into consideration the level of transmission power emitted by the antenna based on the detected presence of the user's hand next to the antenna as well as the orientation (i.e., closed orientation) of the information handling system. Still further the sensor fusion machine learning process may determine whether a roaming process is even to be considered where additional or different access points are even available at the location of the information handling system. Because of all of these factors, the output resulting from the execution of the sensor fusion machine learning process may vary and may not be determined without sufficient training data presented to the information handling system as well as the type of supervised or unsupervised learning algorithm used.

In other examples, the sensor fusion machine learning process may receive other inputs such as the user's hand not being close to the antenna, the information handling system not moving, or any other environmental characteristic that, when used as input, changes the output provided by the sensor fusion machine learning service. In some examples, even the same occurrences (i.e., the user closes a laptop, grabs the laptop directly at a location where the antenna of the information handling system is present, and walks away from an original location beyond a threshold distance) among different locations will result in different output based on other factors related to the environment the information handling system is within (i.e., a home versus a workplace or public wireless access location).

As a consequence of implementing the sensor fusion machine learning process, the output presented by the sensor fusion machine learning process to the information handling system may prevent, whenever possible, the complete wireless disconnection from a network while still taking into consideration the level of emitted electromagnetic radiation to reduce the SAR levels sufficiently to not harm the user. Similarly, the sensor fusion machine learning process may direct the emissions of the electromagnetic radiation from the antenna using elements of the antenna based on the SAR values, the location of any additional or different access points available, and the placement of the user's body so as to also prevent, whenever possible, the complete wireless disconnection from a network while still taking into consideration the level of emitted electromagnetic radiation to reduce the SAR levels sufficiently to not harm the user.

Figure 3:
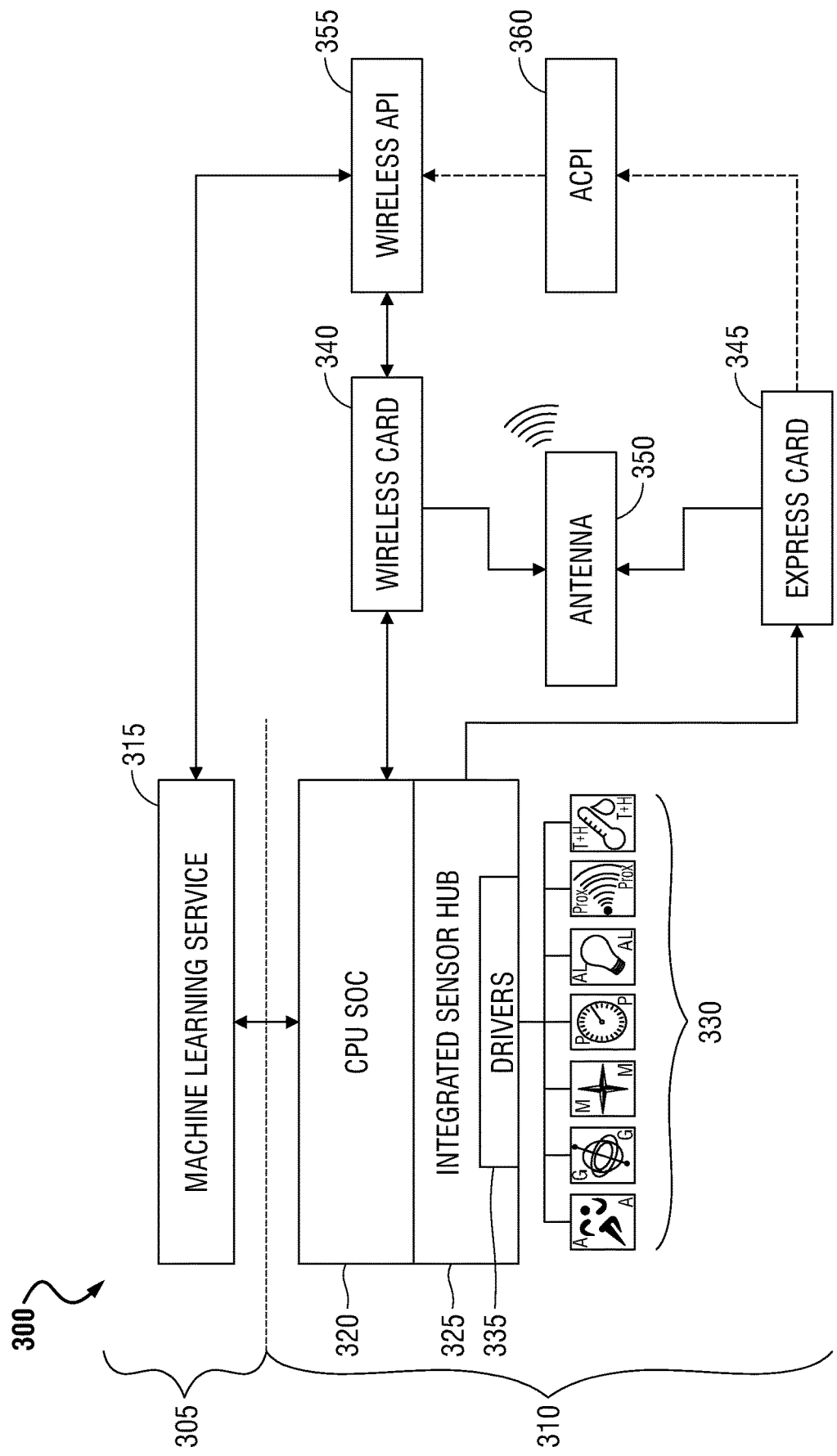
FIG. 3 is a block diagram of a mobile information handling system according to an embodiment of the present disclosure.

In order to conduct the processes and methods described herein, the mobile information handling system 200 may include hardware, software, firmware of a combination thereof. FIG. 3 is a block diagram of a mobile information handling system 300 according to an embodiment of the present disclosure. The mobile information handling system 300 may include any number of processing devices such as the central processing unit (CPU) system-on-chip (SoC) 320 that may receive computer-readable program code that, upon its execution, performs the processes and methods described herein. Along with a number of other elements within the mobile information handling system 300, the CPU SoC 320 may form part of a firmware portion 310 of the mobile information handling system 200. In an embodiment, the mobile information handling system 200 may be a thin client that uses a CPU SoC 320 of another information handling system communicatively coupled to the thin client. In this embodiment, the firmware portion 310 may be maintained on a different information handling system than the thin client with the thin client receiving a virtual machine representation of the executed code of the CPU SoC 320. Thus, in any embodiment presented in this disclosure, FIG. 3 is merely as a representation of a physical location of the elements described herein. However, the present description contemplates that the elements represented in FIG. 3 as well as any other figures described herein, may be distributed among any number of mobile information handling systems 300, severs, or any other type of computing device.

The CPU SoC 320 may be communicatively coupled to (i.e., an ASIC) or execute (i.e., as computer-readable program code) an integrated sensor hub 325. The integrated sensor hub 325 may be any type of device or computer-executable program code that gathers any data or information from any number and type of sensor 330 associated with the mobile information handling system 300. As described herein, the integrated sensor hub 325 may then pass the data or information onto a wireless performance modulator for processing as described herein. Each of the sensors 330 may interface with the integrated sensor hub 325 via a group of or individualized drivers 335.

The sensors 330 may be any type of sensor that measures any characteristic associated with the mobile information handling system 300. By way of example, some sensors 330 may include sensors that measure the movement of the mobile information handling system 300. These sensors 330 may detect any movement of any portion of the physical devices associated with the mobile information handling system 300 as well as the mobile information handling system 300 itself. Example sensors 330 that detect movement may include an accelerometer, a gyroscope, hall effect sensor, and magnetometer, among others. Other types of movement detection sensors 330 may implement any technologies such as infrared-based devices, microwave-based devices, ultrasonic-based devices, tomographic-based devices, digital photography-based devices, and magnetic-based devices, among others.

The sensors 330 may also include a SAR sensor 330. As described herein, a SAR sensor 330 may discriminate between inanimate objects located around the sensor 330 and a human body. Additional or alternative types of sensors 330 may be used to detect the presence of a human such as video or digital photography-based devices and the present specification contemplates the use of these types of sensors 330 to detect the presence of a human as described herein. In an embodiment, the sensors 330 may alternatively or additionally include a microphone to detect sound around the information handling system 300 and/or an infrared (IR) sensor to detect the presence of a human similar to the SAR sensor 330 described herein. In an embodiment, the SAR sensor 330, microphone, and/or IR sensor may be used in any combination to detect and/or confirm the presence of a human being at or near the information handling system 300. In an embodiment, the SAR sensor 330, microphone, and/or IR sensor may detect the presence of a human being within a threshold distance near the information handling system 300. In an embodiment, the threshold distance is between 1 and 2 feet from an antenna 350 of the information handling system 300. In another embodiment, the threshold distance is a foot or less from the antenna 350.

In an embodiment, the sensors 330 may also include any orientation sensor 330 that may detect the orientation of the mobile information handling system 300 as described herein. In a specific embodiment, the orientation sensor 330 may determine the relative position of a screen portion of the mobile information handling system 300 to a keyboard portion. As described herein, some example mobile information handling system 300 include a multi-orientation laptop device that allows a user to configure the laptop into a laptop configuration, a stand configuration, a tent configuration, and a tablet. The orientation sensor 330 may, therefore, detect the orientation of the information handling system 300 in order to detect how the changes in orientation of the information handling system 300 effects the location, orientation, and/or performance of the antenna 350 of the information handling system 300.

As described herein, the mobile information handling system 300 may include a wireless network interface 340 having a radio, controllers, radio front end, drivers, and an antenna 350 used to send and receive electromagnetic signals on a plurality of wavelengths. During operation, the integrated sensor hub 325 may report all data received from all of the sensors 330 to a wireless performance modulator. As described herein, the wireless performance modulator may coordinate with a machine learning service to determine an orientation of the mobile information handling system 300 and adjust a transmission power of an antenna 350 of the wireless network interface 340 and/or initiate a roaming process to search for all accessible access points. In an example, the orientation of the mobile information handling system 300 may include an angle of the screen portion relative to the keyboard portion (i.e., a hinge angle) and orientation of the mobile information handling system 300 itself, (i.e., sitting flush on a desktop, held within the air, etc.).

In an embodiment, the mobile information handling system 300 may include an express card 345 that connects, for example, a network interface controller (NIC) of the mobile information handling system 300. The express card 345 may implement an advanced configuration and power interface (ACPI) that changes the transmission power of the antenna 350 via interaction with a wireless application programming interface (API) 355. The express card may, in an embodiment, receive input from the CPU SoC 320 descriptive of how the power of the antenna 350 is to be adjusted. Additionally, or alternatively, in certain embodiments the express card 345 may receive, from the CPU SoC 320, data descriptive of how and to what extent the electromagnetic radiation emitted by the antenna 350 is to be steered. In this embodiment, the express card 345 may cause a main lobe of a radiation pattern through, for example, changing the relative phases of the radio frequency signal driving elements within the antenna 350. Again, the extent to which the transmission power of the antenna 350 and the beam steering of the RF signal of the antenna 350 are changed is based on the data received by the CPU SoC 320 and evaluated by the sensor fusion machine learning service 315 communicatively coupled to the CPU SoC 320.

After and during execution of the processes and methods described in connection with FIG. 3, the sensor fusion machine learning service 315 may receive any number of data points and/or information from the sensors 330 and combine that data and/or information in connection with a detected orientation mode the user is using the mobile information handling system 300. In connection with this process, the detected orientation mode and data and/or information from the sensors 330 may be evaluated by the sensor fusion machine learning service 315 to learn in what orientation the user is implementing the mobile information handling system 300, where the user is implementing the mobile information handling system 300, and whether the mobile information handling system 300 is receiving or transmitting data. With these factors in mind, the sensor fusion machine learning service 315 may learn how to best alter the characteristics of the transmission power and beam direction of the antenna 350 so as to obtain the best wireless performance possible. Thus, as certain environmental parameters (i.e., orientation mode, presence of a human, location of the mobile information handling system 300, etc.) are detected, the sensor fusion machine learning service 315 may dynamically alter the characteristics of the transmission power and beam direction of the antenna 350 accordingly. In an embodiment, the CPU SoC 320 may send to the wireless network interface 340 data descriptive on how to adjust the transmission power of the antenna 350 while sending, to the express card 345, data descriptive of how to steer the beam as described herein.

Figure 4:
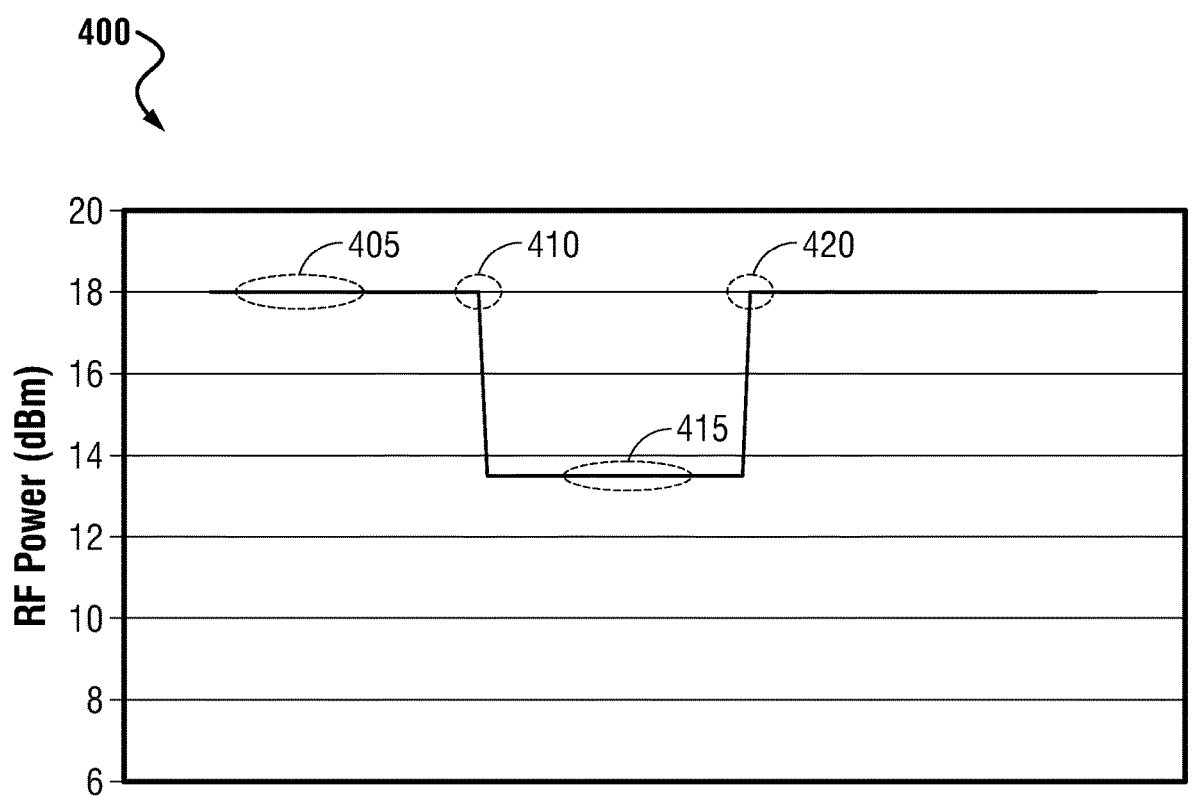
FIG. 4 is a graph depicting changes in transmission power of an antenna of a wireless network interface according to an embodiment of the present disclosure.

FIG. 4 is a graph 400 depicting changes in transmission power of an antenna of a wireless network interface according to an embodiment of the present disclosure. Although the graph 400 shows changes in a transmission power of an antenna after certain events have occurred, the graph 400 is not meant to be depictive of any specific time frame or timeline of events. Instead, the present specification and FIG. 4 contemplates that any amount of time may have passed between any number of triggering events and that any triggering event may be conducted in any order different from the order presented in the graph 400.

The graph 400 shows a first point 405 that indicates that a mobile information handling system may have a radio frequency (RF) transmission power of about 18 decibel-milliwatts (dBm). In an embodiment the RF transmission power may be greater than 13 dBm. This level of RF transmission power may be set upon the detection by a wireless performance modulator that the mobile information handling system is in an orientation mode such as a laptop orientation mode as described herein. The level of the power described herein may be selected based on a number of factors including, but not limited to, the specific orientation mode the mobile information handling system is placed in (i.e., the laptop orientation mode), the location of the antenna within the mobile information handling system, the capabilities of the antenna and/or wireless network interface of the mobile information handling system, and the location of a user relative to the mobile information handling system, among other factors.

In an embodiment, the mobile information handling system and specifically the wireless performance modulator may continually monitor for changes in the orientation of the mobile information handling system. In the examples presented in FIG. 4, at point 410, the wireless performance modulator of the mobile information handling system may, via a number of sensors, determine that the mobile information handling system is being placed in a tablet orientation. This may be done by a user by, for example, folding a keyboard portion against a screen portion such that the screen of the screen portion is facing the user and a bottom surface of the keyboard portion is placed against the back of the screen portion. As the mobile information handling system is being transformed into the tablet orientation, a change in the specific absorption rate of the RF signals from the antenna at a human body may be significant to alter the transmission power of the antenna. In the example presented in FIG. 4, upon detection of the conversion of the mobile information handling system into a table orientation at 410, the transmission power may be reduced at 415 to a lower dBm such as about 13.75 dBm. The amount of reduction of transmission power, again, may dependent on a number of factors including the presence of a human by the mobile information handling system, location of the antenna within the mobile information handling system, the capabilities of the antenna and/or wireless network interface of the mobile information handling system, and the location of a user relative to the mobile information handling system, among other factors.

At any point, such as point 420, that the wireless performance modulator has detected that the orientation mode has been changed from the tablet orientation to another orientation as described herein, the RF transmission power may be increased. Additional types of orientations described herein may further alter or cause the wireless performance modulator to alter the transmission power and the present specification contemplates these changes. The alteration of the transmission power may be conducted so as to keep the amount of electromagnetic radiation emitted from the mobile information handling system in order to prevent the user from being subjected to unsafe levels of electromagnetic radiation. In an embodiment, because the tablet orientation has been determined to be the largest challenge for SAR performance, the power may be reduced only while the mobile information handling system is placed in that specific orientation.

FIG. 5 is a graphic table 500 describing a plurality of orientation modes of a mobile information handling system according to an embodiment of the present disclosure. The spreadsheet 500 shows the orientation modes 505, 510, 515, 520, and 525 described herein with an indication on what the orientation modes 505, 510, 515, 520, and 525 look like, how transmission power of the mobile information handling system is altered based on the change in orientation mode when an antenna of the mobile information handling system is in a keyboard portion or hinge portion of the mobile information handling system, and how transmission power of the mobile information handling system is altered based on the change in orientation mode when an antenna of the mobile information handling system is in a screen portion of the mobile information handling system. Although the spreadsheet 500 described in FIG. 5 shows five distinct orientation modes 505, 510, 515, 520, and 525, the present specification contemplates that the mobile information handling system may be placed in other orientations that may dictate how, and to what extent a transmission power of a wireless antenna is to be adjusted upon detection of those other orientation modes.

The spreadsheet shows a laptop orientation 505. The laptop orientation 505 may be an orientation mode that places a keyboard portion of the mobile information handling system on a surface with a screen portion of the mobile information handling system placed at an angle relative to the keyboard portion such that a user may view the screen on the screen portion. In this arrangement, in an embodiment, the transmission power (i.e., wireless performance) for an antenna associated with a wireless network interface may be reduced when motion is detected by any motions sensors within the mobile information handling system. When the sensors do not detect movement of the mobile information handling system, the transmission power may be set to a full performance level such as the 18 dBm presented in connection with FIG. 4. As described herein, the data received from any of the sensors of the mobile information handling system may be received by the CPU SoC and analyzed by the wireless performance modulator and sensor fusion machine learning service. In an embodiment, as the transmission power is reduced due to data indicating that the mobile information handling system is in motion, a determination may be made as to whether a location of the mobile information handling system has changed. In an example, motion detection may simply indicate that the mobile information handling system was shifted a small degree or otherwise bumped. However, when the sensors indicate that the mobile information handling system has changed location to a certain degree, a roaming process may be initiated in order to allow the mobile information handling system to be communicatively coupled to an access point that potentially has a relatively stronger signal. In an embodiment, the transmission power of the antenna may concurrently be reduced to a lower transmission power such as the 13.75 dBm level indicated in FIG. 4. The reduction in transmission power and the initiation of the roaming process allows a user to access the most reliable wireless connection so as to increase the transmission and receiving capabilities of the mobile information handling system. When motion is no longer detected by the sensors, the roaming process may continue until a network connection is established and may then end.

Where the data from the sensors indicates that the mobile information handling system is no longer moving or had not been moved, the wireless performance modulator may further detect whether a human is within close proximity to the mobile information handling system using the SAR sensor described herein. In the case where the mobile information handling system is in a laptop orientation 505, the transmission power of the antenna may be maintained at a full power limit such as 18 dBm shown in FIG. 4. This allows a user to transmit data to an accessible access point while still maintaining the ability of the mobile information handling system to immediately search for a new access point and reduce transmission power when movement of the mobile information handling system is detected.

The spreadsheet 500 further indicates that the transmission power of the antenna may remain at full performance (i.e., 18 dBm) when in a laptop orientation 505. This may occur in a situation where the antenna of the wireless network interface is located on the screen portion of the mobile information handling system. In this embodiment, because the antenna is on the screen portion, the transmission power may be maintained due to the arrangement of the antenna not directing a specific amount of electromagnetic radiation towards the user. Without a significant need to consider the specific absorption rate at a human body, the transmission power, in this embodiment, may remain stable regardless if movement is detected by the sensors.

Other orientations 505, 510, 515, 520, 525 of the mobile information handling system may also be realized by the user with similar affects to the transmission power of the antenna based on the location of the antenna on the mobile information handling system. Indeed, where the orientation mode is a stand orientation 510, a tent orientation 515, a modified stand orientation 520 or a tablet orientation 525, the transmission power of the antenna may be reduced upon detection by the sensors that the mobile information handling system is being moved. In this case, the roaming process may be conducted as described. Where motion is not detected, the transmission power of the antenna may be kept at an average level (i.e., about 13.75 dBm) as described herein. Reduction of the transmission power of the antenna may, in some embodiments, reduce power consumption due to transmission of data when movement of the mobile information handling system is detected. In these orientation modes 510, 515, 520, and 525, the reduction of the transmission power may be dependent on the orientation used when the antenna of the wireless network interface is located in the screen portion of the mobile information handling system.

As described herein, data descriptive of the orientation of the information handling system may be combined with other data such as the state of the information handling system and the detection of whether a human is close to the information handling system in order to determine the transmission power and steering of the antenna. In a specific embodiment, whether the information handling system is an on state or an off state may determine the transmission power of the antenna. In an embodiment, the presence of a user by the information handling system may also be used as a factor to determine the transmission power of the information handling system. By way of example only, where the information handling system is in an off state with no human detected near the information handling system, the transmission power may be increased relative to a situation where the information handling system is in an on state and a human is detected.

Figure 6:
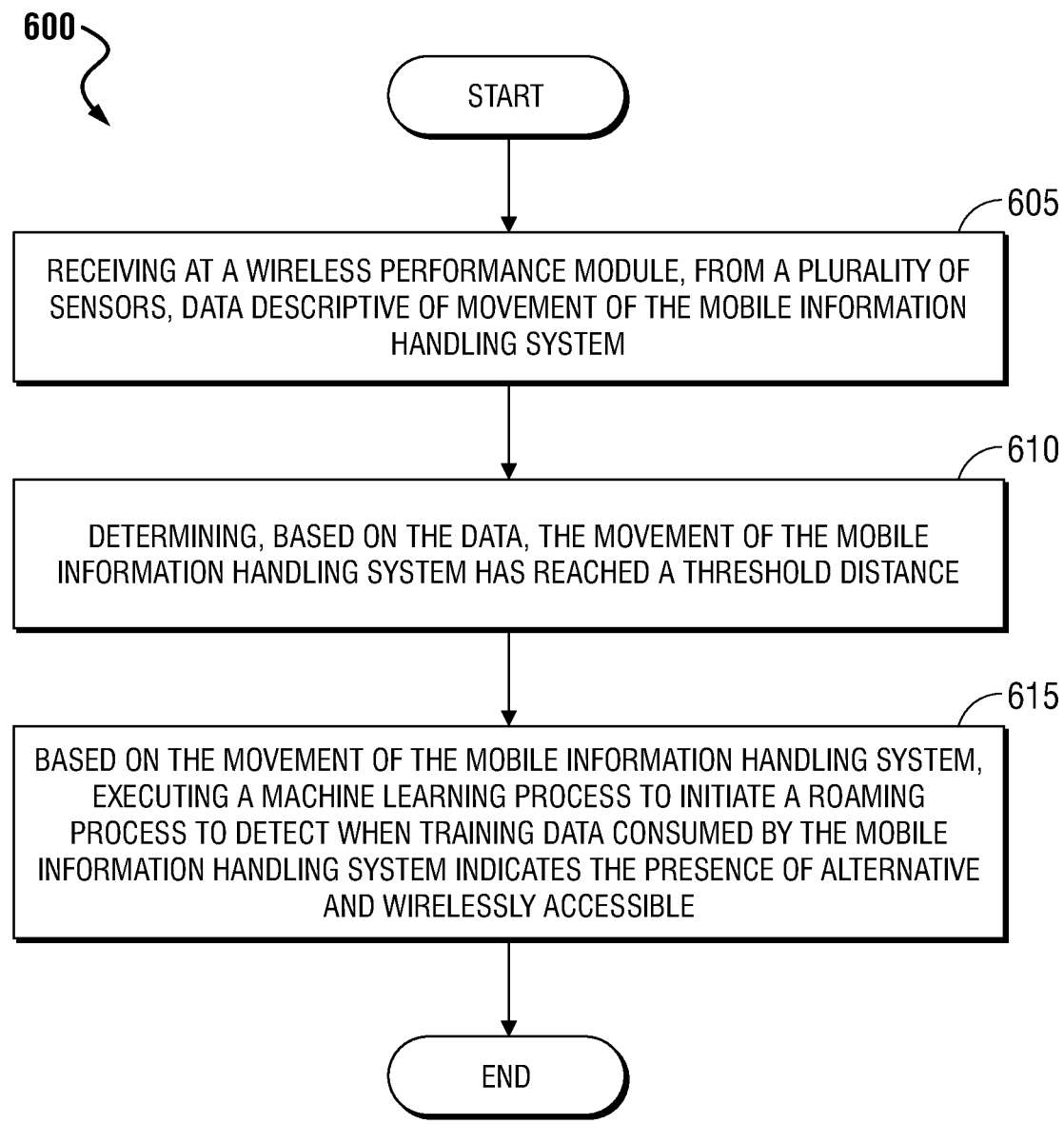
FIG. 6 is a flow diagram illustrating a method of dynamically modulating a performance of a mobile information handling system according to an embodiment of the present disclosure.

FIG. 6 is a flow diagram illustrating a method 600 of dynamically modulating a performance of a mobile information handling system according to an embodiment of the present disclosure. The method 600 may begin at block 605 at a wireless performance module, receiving at a wireless performance module, from a plurality of sensors, data descriptive of movement of the mobile information handling system. As used in the present specification and in the appended claims, the "data descriptive of a state" of the mobile information handling system may be any data received by any of the sensors described herein. This data describes, at least, a state of the mobile information handling system such as any one of the orientation modes, movement of the mobile information handling system, and a presence of a user within the vicinity of the mobile information handling system. As described herein, the sensors used to determine the orientation of the mobile information handling system may include an accelerometer, a gyroscope, and hall effect sensors among others. In some embodiments, the sensors used to determine the movement of the mobile information handling system may include an accelerometer among other movement detection devices. In some embodiments, the sensors used to determine the presence of a human within a vicinity of the mobile information handling system may include a SAR proximity sensor which may be a camera, an infrared sensor, a capacitive sensor, an acoustic sensor, or another type of sensor. Each of these different sensors may be used to define a state of the mobile information handling system so as to increase the functionality of the mobile information handling system by determining if and how to adjust a transmission power of an antenna associated with the wireless network interface as well as when to initiate a roaming process.

The method 600 may continue at block 610 by determining, based on the data received from the sensors, the state of the mobile handling system. As described herein, the state of the mobile information handling system, in one aspect, may include a specific orientation of the mobile information handling system such as a laptop orientation, a stand orientation, a tent orientation, a modified stand orientation, and a tablet orientation, among others. In this embodiment, the data detected by the sensors may be received by a wireless performance modulator that determines a position of a keyboard portion of the mobile information handling system with a screen portion of the mobile information handling system as well as, in an example, an x-, y-, and z-orientation of the screen portion and the keyboard portion. Based on the orientation, the wireless performance modulator may, at block 615, adjust the transmission power of an antenna associated with a wireless network interface of the mobile information handling system. In any example presented the position of the antenna within the mobile information handling system may also be taken into consideration when determining if and how to adjust the transmission power of the antenna per FIG. 5 described herein.

As described herein, the state of the mobile information handling system, in one aspect, may include whether the mobile information handling system is being moved. The sensors (i.e., an accelerometer) may send data to the wireless performance modulator descriptive of whether motion is detected. When motion is detected, the wireless performance modulator may then determine whether or not to initiate a roaming process. In an embodiment, the wireless performance modulator, upon a determination that that motion is detected, may determine whether a user is within the proximity of the mobile information handling system by receiving SAR data from a SAR sensor. Based on whether a human is detected within the vicinity of the mobile information handling system may determine whether a transmission power of the antenna is adjusted and whether a roaming process is initiated. This roaming process initiation may be conducted in advance of present roaming initiations such that the described roaming process occurs due to a reduction in RSSI. This roaming process may thus avoid any delays and reductions in signal quality related to the information handling system being moved further away from a wireless connection point such as an access point.

As described herein, the state of the mobile information handling system, in one aspect, may include whether a human is within the vicinity of the mobile information handling system. This determination (i.e., at block 610) may be used to by the wireless performance modulator to determine, in some embodiments, whether the transmission power of the antenna is to be adjusted. Again, the adjustment of the transmission power of the antenna may be done so as to prevent excessive amounts of electromagnetic radiation from entering a human body and may, therefore, limit exposer of this electromagnetic radiation at or below regulated levels. In some embodiments, the orientation mode and placement of the antenna within the mobile information handling system may be taken into consideration with the data received from the SAR sensor in order to determine if and how to adjust the transmission power, at block 615, of the antenna.

As the method 600 is initiated by the wireless performance modulator under the execution of computer-readable program code by the CPU SoC of the mobile information handling system, the determination at block 615 as to whether to adjust the transmission power of the antenna may be dependent on the data received by any of the sensors. Indeed, in some examples where the data received indicates that the transmission power should be reduced may be overridden by other data received by other sensors. By way of example, data received by a sensor indicating that the mobile information handling system has been placed in a specific orientation mode may indicate that the transmission power should be reduced. However, data received by another sensor that the antenna is placed within a specific location of the mobile information handling system may override a determination that the transmission power of the antenna should be reduced or the mobile information handling system is moving and a roaming process is to be initiated. Thus, in these examples a sensor fusion machine learning service or module may accumulate all data, and implement in a machine learning process so as to increase the functionality of the mobile information handling system by dynamically adjusting the transmission power and/or initiating a roaming process based on a variety of sensor data received as described herein.

Figure 7:
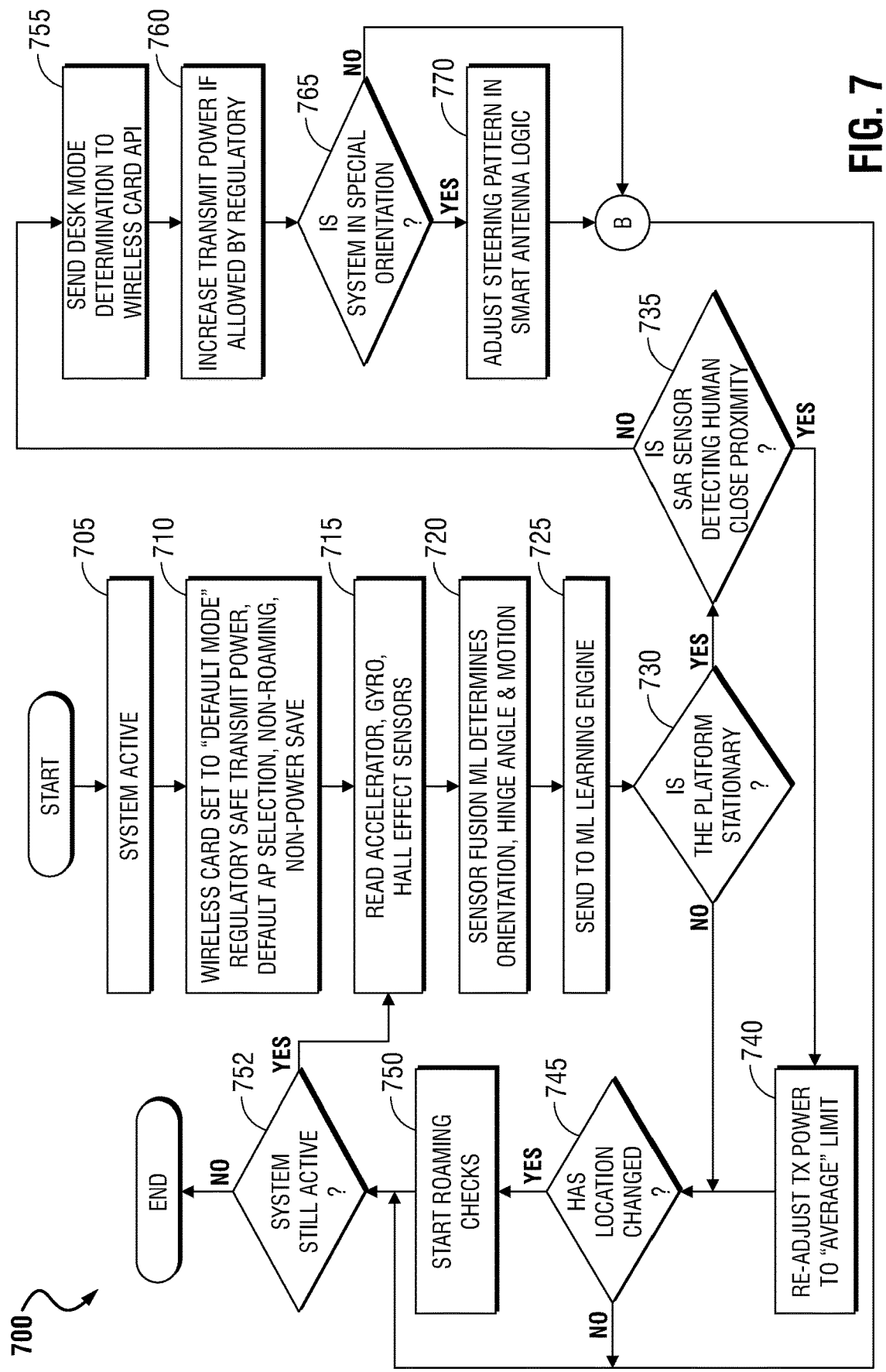
FIG. 7 is a flow diagram illustrating a method of dynamically modulating a performance of a mobile information handling system according to an embodiment of the present disclosure.

FIG. 7 is a flow diagram illustrating a method 700 of dynamically modulating a performance of a mobile information handling system according to an embodiment of the present disclosure. The method 700 may begin with determining, at block 705, that the mobile information handling system. This may be done by detecting a user pressing a power button so as to imitate a boot-up of the mobile information handling system or by detecting a wake state rather than one or more sleep states.

The method 700 may continue at block 710 with setting a wireless network interface of the mobile information handling system to a "default mode." In an embodiment, the default mode be a mode that includes placing the transmission power of the antenna of the wireless network interface at a regulatory safe level, conducting an access point selection process to communicatively couple the mobile information handling system to a network, no roaming process has been initiated, and/or placing the mobile information handling system in a power mode that is not a power saving mode such as a sleep mode or a standby mode. According to the methods described herein, the state of the transmission power of the antenna, the beam forming of the antenna, and the initiation of a roaming process, at least, may be changed.

The method 700 may continue with reading, at block 715, data from the accelerometer, gyroscope and hall effect sensors. This data may be requested and received by the wireless performance modulator described herein in order to facilitate a determination as to whether to adjust the transmission power of the antenna and/or initiate a roaming process. In an example, the wireless performance modulator may coordinate with the sensor fusion machine learning service or module in order to make this determination as described herein.

In an embodiment, the method 700 may continue at block 720 with determining an orientation hinge angle and motion of the mobile information handling system using the sensor fusion machine learning service or module. Thus, in an embodiment, this data from each of these sensors may be received by the wireless performance modulator and/or sensor fusion machine learning service and may be specifically received at 725 by the sensor fusion machine learning service so as to, at least, adjust the transmission power of the antenna of the wireless network interface within the mobile information handling system. As described herein, the sensor fusion machine learning service may implement any type of supervised or unsupervised machine learning algorithm to receive the inputs described herein and output instructions that dictate how and when a roaming process is initiated, how and to what extent the transmission power of the antenna is adjusted, and/or how and in what direction the directionality of the emitted electromagnetic radiation from the antenna is changed. In an example, the sensor fusion machine learning service and the wireless performance modulator may coordinate efforts of the mobile information handling system to adjust the transmission power of the antenna and initiate a roaming process or steer the beam of the antenna, respectively.

The method 700 may continue at block 730 with determining if the mobile information handling system is stationary or moving. In the case where no movement has been detected, via determination at block 730, the method 700 may continue with a determination as to whether a SAR sensor has detected the presence of a human within a specific proximity of the mobile information handling system. A proximity may be any defined distance from the mobile information handling system and, in one embodiment, may be a distance of two feet. Where the determination is that there is a human within the proximity of the mobile information handling system (i.e., "yes" determination at block 735) the transmission power of the antenna may be adjusted per block 740. The adjustment may be made to the antenna such that an "average" transmission power is realized. In an embodiment, the "average" transmission power may be a transmission power that is below the default level. In an example, the transmission power levels depicted in FIG. 4 here may be used where the default transmission power level is about 18 dBm and the average transmission power level is about 13.73 dBm. It is appreciated, however, that the default and average transmission power levels may differ based on changing regulatory transmission power levels.

The method 700, upon a determination that the platform is stationary (i.e., "yes" determination at block 730) and the SAR sensor has detected the presence of a human (i.e., "yes" determination at block 735) by the mobile information handling system, the transmission power is adjusted at block 740 in accordance with disclosures herein including accounting for operating states and orientation of the mobile information handling system.

At 745, a determination is made as to whether the location of the mobile information handling system has changed. When it is determined that the location of the mobile information handling system has changed (i.e., "yes" determination at 745) a roaming process may be initiated at block 750. As described herein, the roaming process may be initiated so as to identify whether any new access points are accessible by the mobile information handling system and/or whether any given access point has a stronger signal. This is done so as reduce the instances where a wireless signal is dropped before the roaming processes is initiated. Indeed, the present method 700 may make the determination at block 745 that the mobile information handling system has been moved and, as a potential result in a reduction in RSSI, may initiate a wireless connection with another access point prior to a complete reduction in RSSI occurs.

The method 700 may be continually and iteratively executed in detecting input from the sensors so as to determine whether, based on movement or lack thereof as well as whether a human is present within the proximity of the mobile information handling system, to adjust the transmission power of the antenna and initiate a roaming process at blocks 740 and 750 respectively. If at 750, proceeding to 752, it is determined that the system is no longer active as in it enters a sleep state or is shut down the flow may end. If not, the iterative checking of sensors may continue by returning to block 715 to check sensors and the flow may proceed as described.

The method 700 may, after determining that the mobile information handling system is not stationary (i.e., sensors indicate movement of the mobile information handling system) at block 730 ("no" determination), a determination may be made as to whether the location of the mobile information handling system is detected at block 745. This determination as to whether a location has changed may initiate a roaming process at block 750 as described herein. This results in the operation of a system that considers the SAR relative to the orientation of the mobile information handling system thereby selectively increasing or reducing the amount of electromagnetic radiation emitted by the mobile information handling system. Additionally, the present methods and systems selectively increases or reduces the amount of electromagnetic radiation emitted by the mobile information handling system based on movement of the mobile information handling system in order to maintain a wireless connection with a wireless network before a complete loss in signal is experienced by the mobile information handling system. This adapting of the wireless signal to a roaming condition and modification of power levels also takes into account the SAR considerations in some embodiments when the wireless performance module applies machine learning to determine how to modify transmission power levels and when to implement roaming based on a variety of received inputs from the variety of sensors.

The method 700 also considers situations where it has been determined, based on sensor data, that the platform is stationary (i.e., "yes" at block 730) and a SAR sensor does not detect the presence of a human by the mobile information handling system (i.e., "no" determination at block 735). In this situation, the mobile information handling system may determine that the detected state mode of the mobile information handling system is a desk mode. This is sent to a wireless network interface API at block 755 which then, at block 760, increases the transmission power of the antenna of the wireless network interface to a maximum transmission allowed by regulations. The method 700 then makes a determination as to whether the mobile information handling system is in a special orientation that requires a reduction in transmission power or not as identified in FIG. 5. Where the mobile information handling system is not in a special orientation that requires a steering of transmission power of the antenna (i.e., "no" determination at block 765) the method continues at block 715 by iteratively receiving input from the sensors. However, where the mobile information handling system is in a special orientation that requires a steering of transmission power of the antenna (i.e., "yes" determination at block 765) the method 700 continues at block 770 by adjusting the steering pattern in the antenna. As described herein, the steering pattern of the antenna may be adjusted by causing a main lobe of a radiation pattern emitted by the antenna to change through, for example, changing the relative phases of the radio frequency signal driving elements within the antenna. For example, use of parasitic antenna elements to change the directionality of the transmitted signal may be activated depending on the detected orientation and location of the antenna. In some embodiments the antenna described herein may include switching elements or phase-shifting elements that may be used to direct the electromagnetic radiation emitted by the antenna so as to steer the shape of the radio frequency (RF) antenna pattern and may be done for one or more transceiving antennas within the information handling system. Different antenna pattern configurations resulting from the manipulation of the parasitic elements may be more optimal than others in embodiments described herein and the selection of certain configurations may depend upon operating conditions of the information handling system such as the orientation of the information handling system. In embodiments of the present disclosure, the information handling system 100 may include a keyboard portion movably connected to a display portion such that the display portion may move through roughly 360 degrees of movement from the base port. For example, the display portion may be placed in a closed configuration such that it abuts the keyboard surface of the keyboard portion (zero degrees), in an open configuration (rotated between zero and 180 degrees away from the keyboard portion), and a tablet configuration (rotated between 180 degrees and 360 degrees away from the base portion). The most optimal antenna pattern for a first one of these positional configurations may be different than the most optimal antenna pattern for a second one of these positional configurations. The present description contemplates any current configuration of the information handling system in order to help determine if the antenna pattern is to be changed and how it is to be changed. Additionally, the location of the antenna within the information handling system may also be considered when determining the positional configurations of the information handling system in order to optimize signal transceiving in specific orientations described herein as well as maintain an industry level SAR value during operation of the information handling system when the presence of a user is detected near the information handling system.

Once the steering pattern has been changed at block 770, the method 700 may continue with iteratively receiving input from the sensors as block 715 such that changes to the transmission power, the roaming process, and the steering pattern of the mobile information handling system may be monitored continuously so as to improve the functionality of the mobile information handling system as described herein. This may depend on whether the information mobile handling system continues to remain active at 752 in some embodiments. If at 765 no special orientation is detected or at 770 the steering pattern is adjusted, flow may proceed to 752 where it is determined that the system is no longer active as in it enters a sleep state or is shut down, then the flow may end. If not, the iterative checking of sensors may continue by returning to block 715 to check sensors and the flow may proceed as described above.

The blocks of the flow diagrams of FIGS. 6 and 7 or steps and aspects of the operation of the embodiments herein and discussed herein need not be performed in any given or specified order. It is contemplated that additional blocks, steps, or functions may be added, some blocks, steps or functions may not be performed, blocks, steps, or functions may occur contemporaneously, and blocks, steps or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The subject matter described herein is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents and shall not be restricted or limited by the foregoing detailed description.

What is claimed is:

1. A mobile information handling system comprising:
a wireless network interface configured to access a first wireless network access point via a wireless link;
a processor to execute code instructions of a wireless performance modulator to adjust the performance of the wireless network interface;
a sensor to receive input descriptive of the environment of the mobile information handling system and, upon execution of a machine learning process, provide the input to the wireless performance modulator to cause the wireless network interface to initiate a roaming process prior to a signal degradation threshold for handover based on information associated with the sensed environment received by the sensor,
wherein the sensor includes a movement sensor to detect the movement of the mobile information handling system; and
the processor to execute code instructions of the wireless performance modulator to initiate a roaming process to search for a second, accessible wireless network access point to communicatively couple with the mobile information handling system upon detection of movement of the mobile information handling system above a threshold distance level to identify the second, accessible wireless network access point prior to the signal degradation threshold for handover and avoid dropping the wireless link.

2. The mobile information handling system of claim 1, wherein the movement sensor detects the movement of the mobile information handling system so as to determine, with the wireless performance modulator, whether to adjust transmission power of the wireless network interface.

3. The mobile information handling system of claim 1, where the threshold distance level is 10 feet.

4. The mobile information handling system of claim 1, wherein the movement sensor detects the movement of the mobile information handling system so as to, with the wireless performance modulator, engage an access point selection process as part of the roaming process.

5. The mobile information handling system of claim 1, wherein the sensor is a specific absorption rate (SAR) sensor to detect a presence of a human proximity to the mobile information handling system and the wireless performance modulator is configured to adjust power to an antenna utilized by the wireless network interface of the mobile information handling system.

6. The mobile information handling system of claim 1, wherein the mobile information handling system comprises:
a screen portion;
a keyboard portion mechanically coupled via a hinge to the screen portion; and
a configuration sensor to determine the relative positioning of the screen portion to the keyboard portion,
wherein the sensed orientation of the screen portion relative to the keyboard portion by the configuration sensor determines a radiation steering pattern associated with an antenna of the wireless network interface.

7. The mobile information handling system of claim 1, wherein the wireless performance modulator is configured to:
receive input from the sensor to determine whether the mobile information handling system is stationary; and
receive input from a specific absorption rate (SAR) sensor to determine whether a human is within a proximity to the mobile information handling system; and
when the mobile information handling system is stationary and a human is detected to be within a proximity of the mobile information handling system, the wireless performance modulator adjusts a transmission power of an antenna of the wireless network interface.

8. A method of dynamically modulating a performance of a mobile information handling system, comprising:
accessing a first wireless network access point via a wireless network interface configured to establish a wireless link;
receiving at a wireless performance module, from a plurality of sensors, data descriptive of movement of the mobile information handling system and other wireless environment metrics of the mobile information handling system;
determining, based on the data descriptive of movement, that the movement of the mobile information handling system has reached a threshold distance of movement; and
based on the movement of the mobile information handling system reaching the threshold distance, executing a machine learning process with the threshold distance movement data and other wireless environment metrics to initiate a roaming process prior to a signal degradation threshold being reached for handover to avoid dropping the wireless link when training data consumed by the mobile information handling system indicates the presence of alternative, wirelessly accessible access points.

9. The method of claim 8, further comprising:
adjusting a transmission power of a wireless antenna for the mobile information handling system associated with a wireless network interface based upon a determination that:
the mobile information handling system is stationary in that it is below the threshold distance; and
a specific absorption rate (SAR) sensor associated with the mobile information handling system detects the presence of a human proximate to the mobile information handling system.

10. The method of claim 8, further comprising:
adjusting a direction of electromagnetic radiation emitted by a wireless antenna of the wireless network interface of the mobile information handling system upon a determinization that:
the mobile information handling system is stationary; and
a specific absorption rate (SAR) sensor associated with the mobile information handling system detects the absence of a human proximate to the mobile information handling system.

11. The method of claim 8, wherein the data descriptive of the movement of the mobile information handling system originates from a movement sensor that detects movement of the mobile information handling system is at or below the threshold distance to determine whether to adjust the transmission power of the wireless network interface.

12. The method of claim 8, wherein the data descriptive of the movement of the mobile information handling system originates from a movement sensor that detects movement of the mobile information handling system is at or above the threshold distance to initiate a roaming process to communicatively couple the mobile handling system to a network.

13. The method of claim 8, wherein the data descriptive of the movement of the mobile information handling system originates from a movement sensor that detects movement of the mobile information handling system is at or above the threshold distance to determine whether to initiate an access point selection process.

14. The method of claim 8, further comprising;
receiving at the wireless performance module, data descriptive of a human presence near an antenna of the mobile information handling system that originates from a specific absorption rate (SAR) sensor to detect a presence of a human proximity to the mobile information handling system; and
adjusting power consumption by a wireless antenna of the mobile information handling system based on the detected human proximity.

15. The method of claim 8, further comprising:
receiving at the wireless performance module, data descriptive of the orientation of the mobile information handling system that originates from a configuration sensor that determines a relative positioning of a screen portion of the mobile information handling system to a keyboard portion of the mobile information handling system; and
determining a transmission power of an antenna of a wireless network interface of the mobile information handling system based on a sensed orientation of the screen portion relative to the keyboard portion by the configuration sensor.

16. A mobile information handling system executing computer-readable code of a wireless performance modulator comprising:
a processor executing code instructions of a wireless performance modulator to adjust a performance of a wireless network interface of a mobile information handling system;
a wireless network interface configured to access a first wireless network access point via a wireless link;
a specific absorption rate (SAR) sensor to provide data descriptive of a presence of a human proximity to the mobile information handling system; and
a movement sensor to detect movement of the information handling system relative to a threshold distance;
the wireless performance modulator to determine, based on the data from the SAR sensor and movement sensor, whether the information handling system has moved a distance less than the threshold distance indicating it is stationary and whether a human is within a proximity to the mobile information handling system;
the wireless performance modulator to instruct the wireless network interface to adjust a transmission power of an antenna of the wireless network interface for the first wireless link; and
the processor to execute code instructions of the wireless performance modulator to initiate a roaming process to search for a second, accessible wireless network access point to communicatively couple the mobile information handling system upon detection of movement of the mobile information handling system above a threshold distance level to avoid dropping the wireless link.

17. The mobile information handling system of claim 16, further comprising:
a machine learning module of the wireless performance modulator to receive the data descriptive of a presence of a human proximity to the mobile information handling system, data descriptive of movement of the information handling system, and data descriptive of an orientation of the information handling system and provide instructions how to adjust the transmission power of the antenna.

18. The mobile information handling system of claim 16, wherein the movement sensor detects the movement of the mobile information handling system for the wireless performance modulator to determine whether to initiate a roaming process to communicatively couple the mobile handling system to an identified, second wireless network access point.

19. The mobile information handling system of claim 16, wherein the movement sensor detects the movement of the mobile information handling system to determine, with the wireless performance modulator, whether to initiate an access point selection process.

20. The mobile information handling system of claim 16, comprising:
a screen portion;
a keyboard portion mechanically coupled via a hinge to the screen portion; and
a configuration sensor to determine a relative positioning of the screen portion to the keyboard portion; and
the wireless performance modulator to use the sensed orientation of the screen portion relative to the keyboard portion by the configuration sensor to determine the transmission power associated with the antenna of the wireless network interface.

* * * * *